Jan. 18, 1949. H. H. WATERS 2,459,745
ART OF PROCESSING RUBBER COMPOUND
Filed March 8, 1945 8 Sheets-Sheet 1
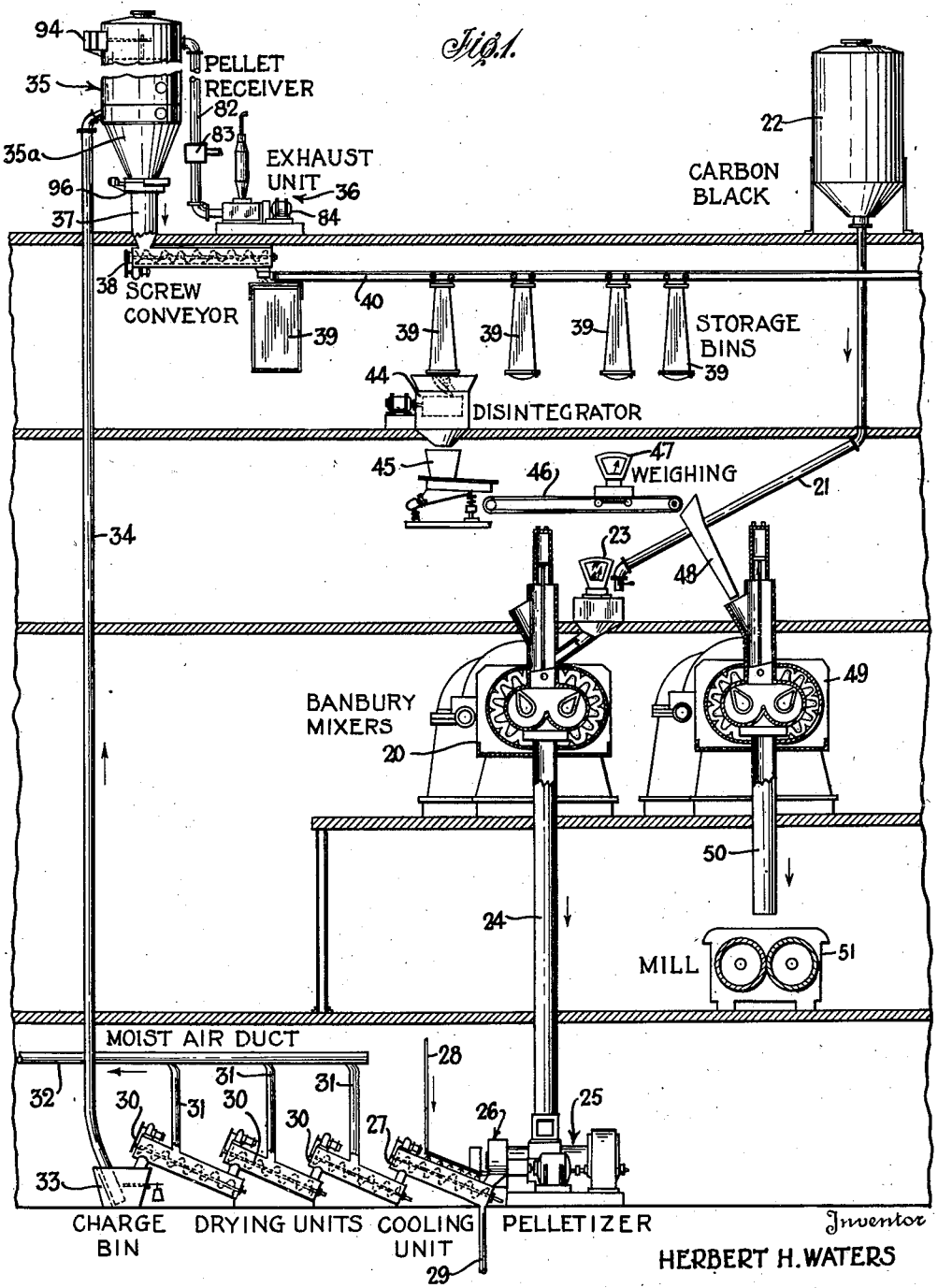
HERBERT H. WATERS

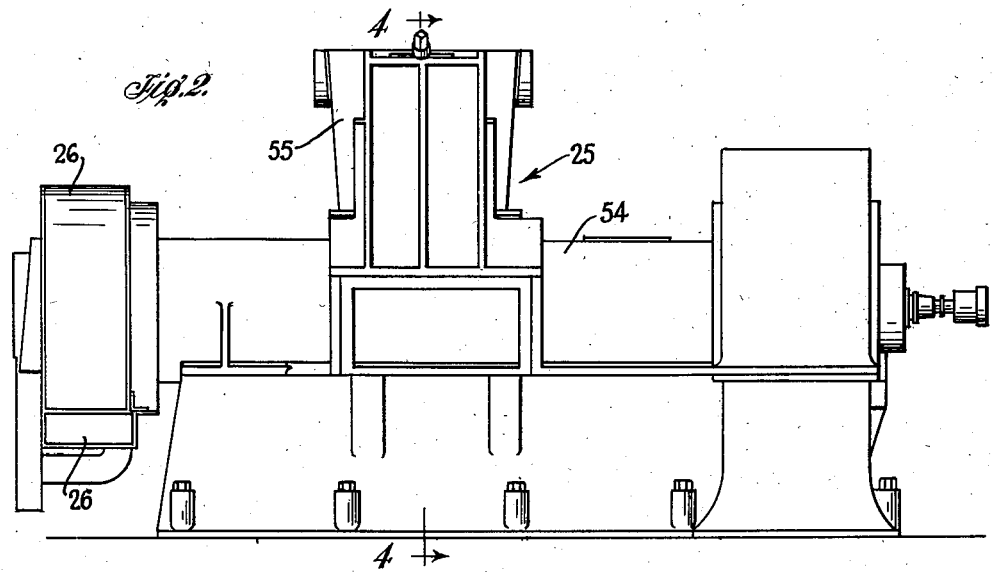
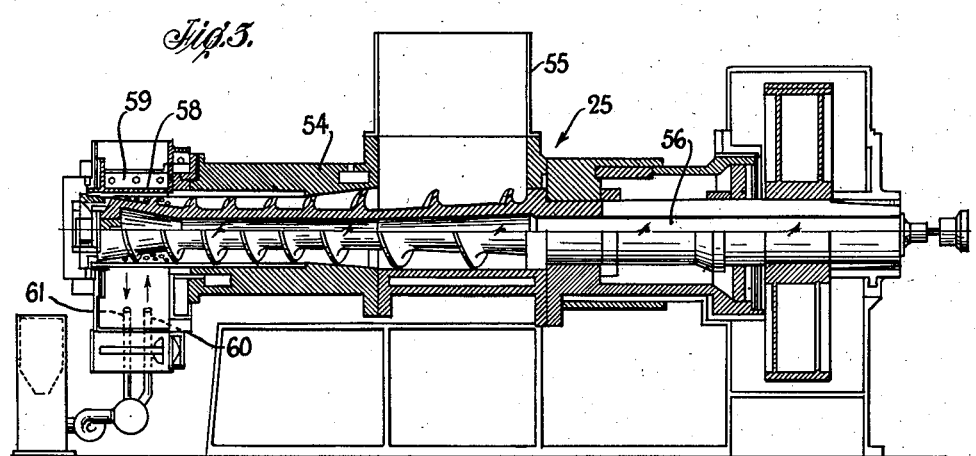
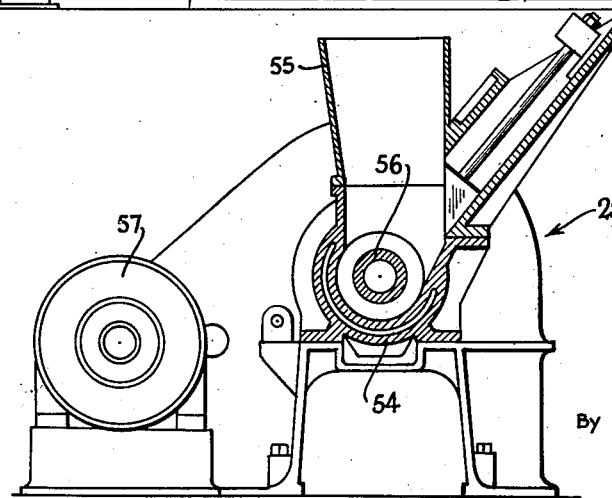

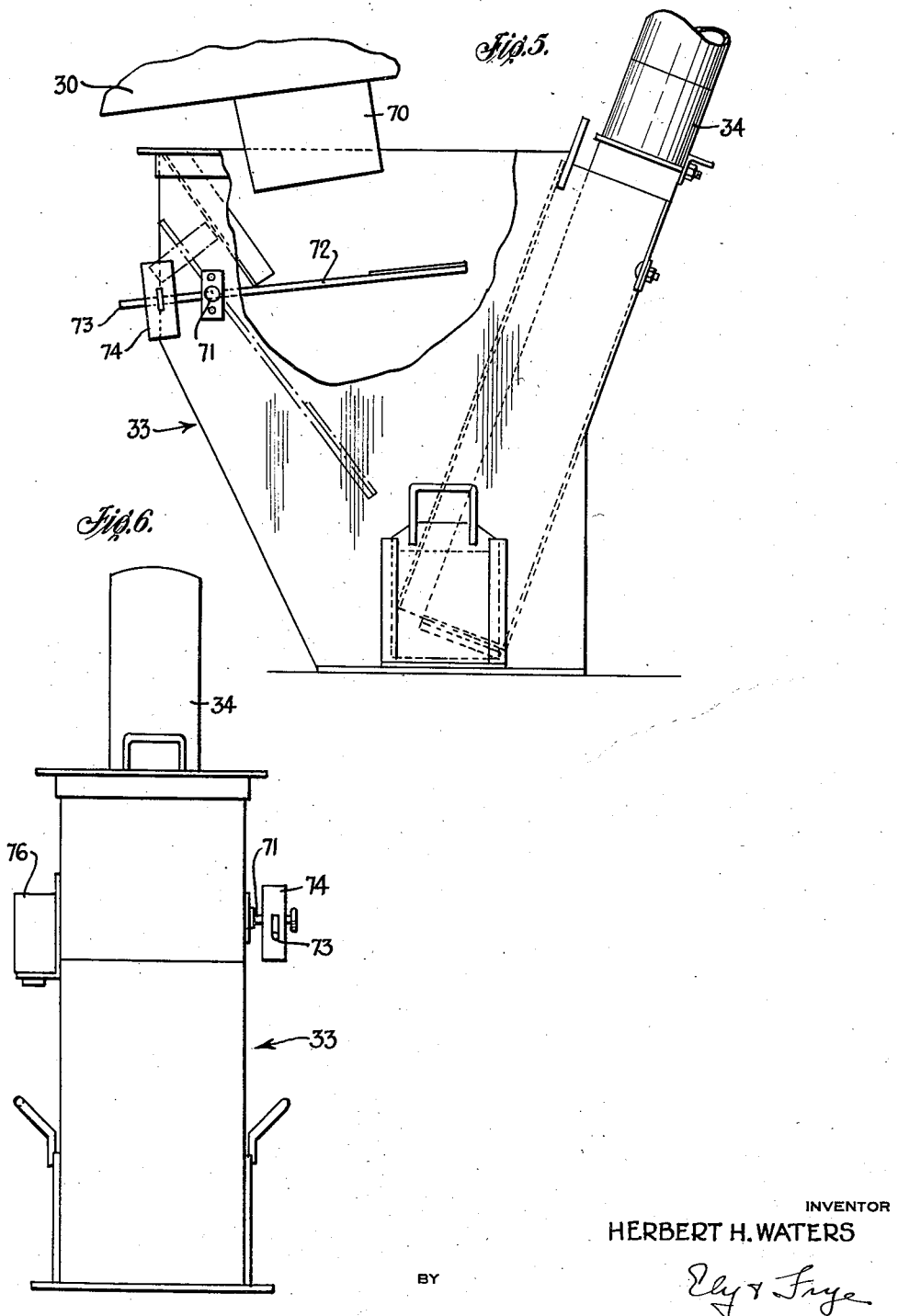

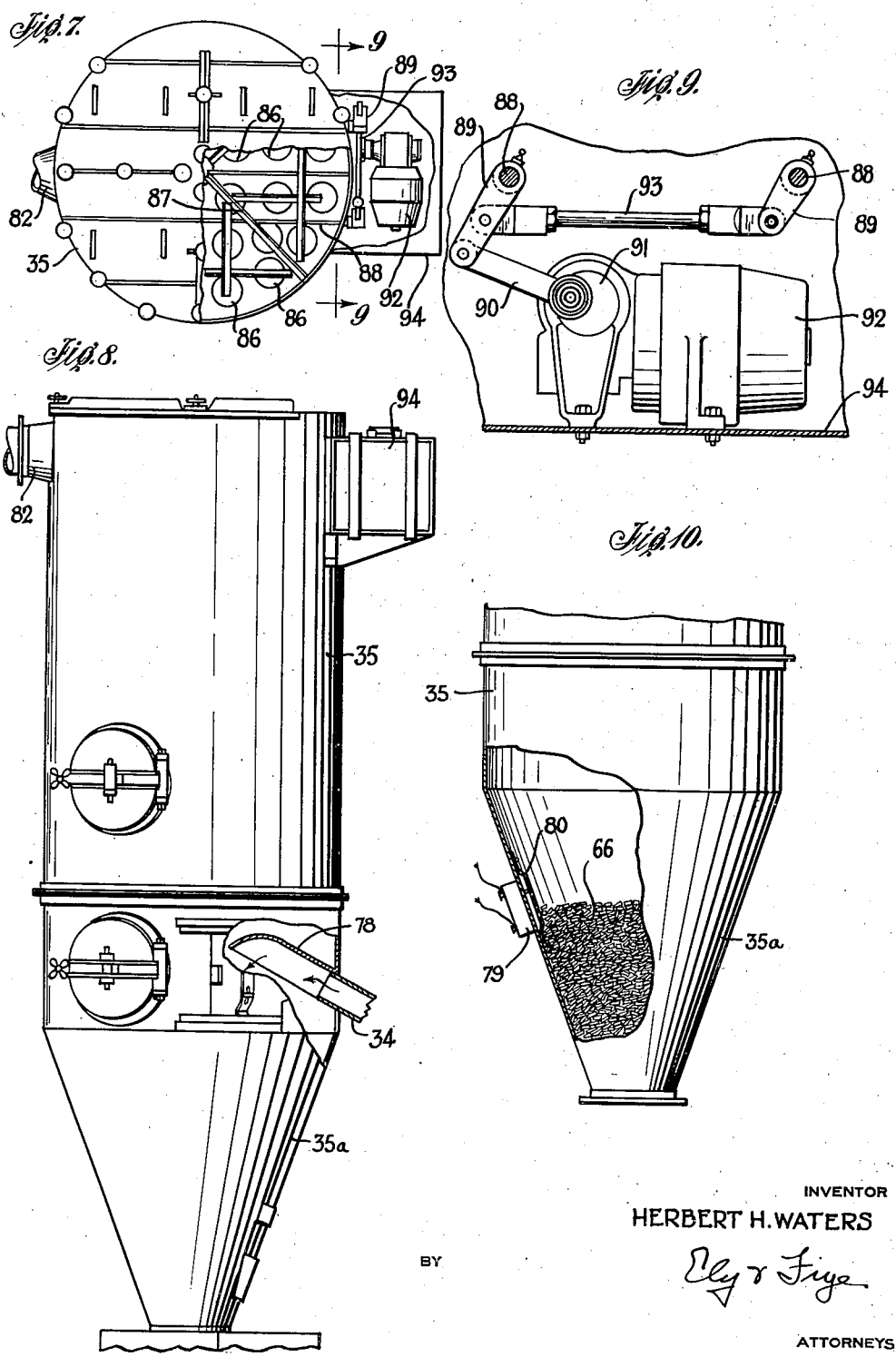

INVENTOR
HERBERT H. WATERS
BY
ATTORNEYS

Jan. 18, 1949.  H. H. WATERS  2,459,745
ART OF PROCESSING RUBBER COMPOUND
Filed March 8, 1945  8 Sheets-Sheet 6

Inventor
HERBERT H. WATERS

Attorneys

Jan. 18, 1949.  H. H. WATERS  2,459,745
ART OF PROCESSING RUBBER COMPOUND
Filed March 8, 1945  8 Sheets-Sheet 7

INVENTOR
HERBERT H. WATERS
BY
ATTORNEYS

Jan. 18, 1949.                H. H. WATERS                 2,459,745
                      ART OF PROCESSING RUBBER COMPOUND
Filed March 8, 1945                                     8 Sheets-Sheet 8

INVENTOR
HERBERT H. WATERS
ATTORNEYS

Patented Jan. 18, 1949

2,459,745

UNITED STATES PATENT OFFICE 2,459,745

ART OF PROCESSING RUBBER COMPOUND

Herbert H. Waters, Akron, Ohio, assignor to The Firestone Tire & Rubber Company, Akron, Ohio, a corporation of Ohio Application March 8, 1945, Serial No. 581,685

2 Claims. (Cl. 260—767)

This invention relates to the art of processing plastic material, such as rubber or rubber-like composition, and more especially it relates to improved procedure and apparatus for compounding unvulcanized rubber composition preparatory to the incorporating of the composition in an article.

The salient feature of the invention is the forming of a masterbatch of rubber composition into pellets, and retaining the batch in pellet form until the final mixing or warm-up operation that immediately precedes utilization of the composition.

The chief objects of the invention are to provide an improved and simplified method of processing plastic material; to provide a compounding method that readily may be practised by automatically operating apparatus; that will require less floor space for the apparatus that carries out the method; to provide a method wherein the compounding, or blending of the plastic is more readily effected; to reduce the amount of mechanical equipment required, consequently reducing maintenance costs; to provide a method of the character mentioned wherein cooling and drying of the plastic composition is more efficiently performed; to provide improved apparatus for the practise of the said method; to effect increased production as the result of shorter mixing cycles; to effect a saving of labor; and to provide improved working conditions. Other objects will be manifest as the description proceeds.

Apparatus embodying and adapted to carry out the invention is shown in the accompanying drawings, of which:

Fig. 1 is a somewhat diagrammatic view of preferred apparatus for the practise of the improved method in its entirety;

Fig. 2 is a side elevation, on a larger scale, of a pellet-forming machine or pelletizer;

Fig. 3 is a longitudinal section through the pelletizer;

Fig. 4 is a transverse section through the pelletizer on the line 4—4 of Fig. 2;

Fig. 5 is a side elevation, on a larger scale, of a bin into which pellets are discharged after passing through a series of drying units, a part being broken away;

Fig. 6 is an end elevation of the bin shown in Fig. 5 as viewed from the left thereof;

Fig. 7 is a plan view of a pellet receiver to which the pellets are pneumatically conveyed from the bin shown in Figs. 5 and 6, a part being broken away to reveal underlying structure;

Fig. 8 is an elevation of the structure shown in Fig. 7 as viewed from the near side thereof;

Fig. 9 is a section, on a larger scale, on the line 9—9 of Fig. 7, showing agitating mechanism mounted upon the side of the pellet receiver, at the right thereof, as viewed in Figs. 7 and 8;

Fig. 10 is a fragmentary elevational detail of the lower portion of the pellet receiver, a part thereof being broken away to reveal an interiorly disposed switch;

Figure 11:
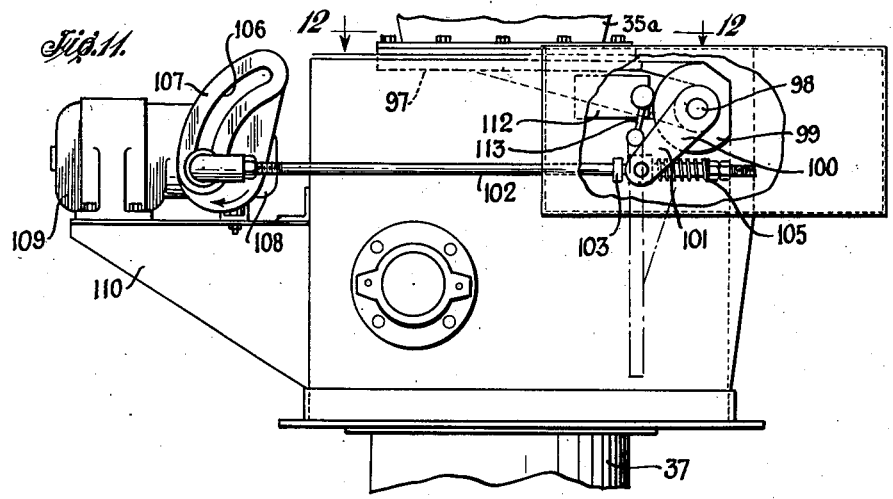
Fig. 11 is an elevational detail, on a larger scale, of dumping apparatus located at the bottom of the pellet receiver, a part being broken away to reveal underlying structure.

The method of the invention will best be understood by reference to Fig. 1 to which attention first is directed. The first step of the method consists in the primary or initial mixing of natural or synthetic raw rubber with pigments, fillers, carbon black and the like, but not vulcanizing ingredients or accelerators. Such mixing is accomplished in a mixer of the well-known "Banbury" type that is designated as a whole by the numeral 20. Carbon black may be delivered by gravity to the mixer 20 through a duct 21 extending to a remote storage supply bin 22 for the carbon black, a weighing scale 23 being located adjacent the mixer for accurately weighing the carbon black to be delivered to said mixer. The rubber composition and other constituents of the batch may be manually weighed or measured, and dumped into the hopper of the mixer. After the batch is thoroughly mixed in the "Banbury" which mixing should require only about seven minutes, the entire batch is discharged through the bottom thereof and enters a chute 24 through which it descends by gravity to a pelletizer that is designated as a whole by the numeral 25.

The pelletizer extrudes the plastic rubber mix through a perforated head, and rotating knives sever the extruded material into pellets. The pelletizer 25 includes a dusting attachment 26 that applies a dust lubricant, such as soapstone, talc, or whiting, to the pellets as they are formed. The pellets are discharged by gravity from the duster 26 and fall into a cooling unit 27 where water from a pipe 28 is sprayed thereon, excess water being removed from the unit through a drain pipe 29. The pellets are received in one end of the cooling unit 27, and are propelled longitudinally of the unit by a screw conveyor mounted therein, being discharged from the opposite end thereof. The discharge end of the cooling unit 27 is located over the receiving end of the first of a series of drying units, said units being of identical construction and each designated as a whole by the numeral 30. The drying units 30 are somewhat similar to the cooling unit 27 in that each includes a screw conveyor by which the wet pellets are propelled from the receiving end to the discharge end of each unit, and tumbled and agitated as they progress. The tops of the drying units 30 are provided with covers, and extending through said covers are respective ducts 31 that communicate with a manifold 32 that extends to a suitable source of suction (not shown). The ducts 31 draw air in from both ends and around the screw of each unit toward the middle thereof, and then discharge the moist air, the arrangement effecting substantial drying and further cooling of the pellets. The drying units 30 are so arranged that each discharges pellets by gravity into the next adjacent unit, the last unit of the series discharging into a charge bin that is designated as a whole by the numeral 33.

As the pellets of the batch flow into the bin 33, they are subjected to pneumatic pressure and conveyed upwardly, through a duct 34, and discharged into a pellet receiver 35. The latter is located at an elevated position, such as the roof of the building. A constantly operating exhaust unit or suction-producing device 36 is operatively associated with the pellet receiver 35 to operate the pneumatic conveyor for the pellets. Pellets received in the receiver 35 are collected in the bottom thereof, from which they are periodically discharged into a duct 37 that empties by gravity into one end of a screw conveyor 38 therebeneath. From the delivery end of the conveyor 38 the pellets are discharged into mobile storage bins 39 that are supported by a monorail 40, each of bins 39 being of such size as to receive a complete batch of pellets. The pellets are retained in the bins 39 until ready for further processing. Since each bin 39 holds a complete batch, it will be obvious that the process lends itself readily to the production of batches of different compositions without the intermingling of material of the different batches.

When it is desired to use the stored pellets, mobile bins 39 of the number desired are moved over a disintegrator 44 into which they automatically dump their contents. The disintegrator breaks up any lumps that may have formed in the batch and separates the pellets so that they flow freely. After passing through the disintegrator the pellets flow by gravity into a vibratory hopper 45 that flows the pellets evenly onto a belt conveyor 46. The latter has a weighing scale 47 operatively associated therewith for weighing the pellets that pass along the conveyor, said weighing scale controlling the operation of the vibratory hopper and stopping operation thereof after a determinate quantity of pellets has been deposited on conveyor 46. The latter discharges the pellets into the receiving chute 48 of a second "Banbury" mixer 49. Other compounding ingredients, such as vulcanizers and accelerators, are introduced into the mixer 49 for incorporation into the rubber batch. Because rubber pellets multiply many times the surface area that comes into contact with the various ingredients, the latter are absorbed faster and blended more thoroughly, with the result that "scorching" of the stock is less likely to occur. After brief but adequate mixing in the mixer 49, the completely compounded composition is discharged from the bottom thereof into a chute 50, and passes by gravity therethrough, finally dropping therefrom into the rolls of a sheeting mill 51. The latter forms the plastic composition into a sheet or sleeve of material on one of the mill rolls, whence slabs or strips of the material are cut for immediate use in any desired processing apparatus (not shown).

Of the apparatus employed to carry out the aforedescribed process, the Banbury mixers 20, 49 are of conventional construction well known in the art so that no detail description thereof is believed necessary. The pelletizer 25, shown in greater detail in Figs. 2, 3 and 4, is essentially similar to that shown in the U. S. patent to MacFarlane Number 1,768,365. As shown, said pelletizer comprises a housing 54 having a hopper 55 that receives the mass of compounded material from the duct 24. Mounted within the housing 54 is a shaft 56 having a gear 57 mounted upon one end thereof, which gear is driven by a suitable prime mover, such as the motor 57, Fig. 4. The opposite end portion of the shaft is screw threaded to force the composition from the hopper toward the left hand end of the machine, as shown in Figs. 2 and 3. At the left end of the machine is a cylindrical, perforated, strainer 58 into which the rubber composition is forced, and through which it is extruded. Cutter knives, such as the knife 59, rotate circumferentially of the strainer 58 and shear off the material as it is forced therethrough, thereby producing rubber pellets. The strainer 58 and knives 59 are enclosed by the dusting attachment 26 (see Fig. 3) into which a dust lubricant, such as soapstone, talc, or whiting is blown through the agency of the pipe 60, said lubricant thoroughly dusting the surfaces of the pellets, as they are formed, and preventing them from sticking to each other. Excess air and lubricant is removed from the apparatus through the outlet pipe 61. The dusted pellets flow from the dusting apparatus by gravity and enter the cooling unit 27 as hereinbefore explained.

Figure 16:
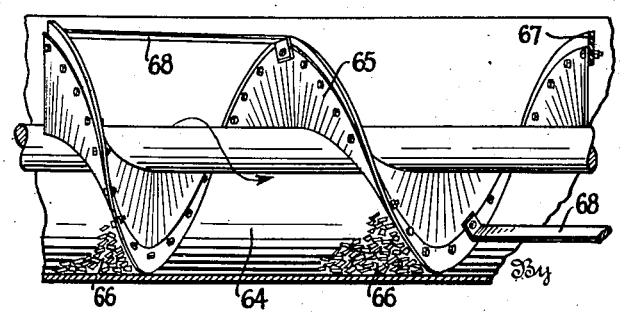
Fig. 16 is a fragmentary sectional view of a screw conveyor such as is employed for moving pellets.

The general arrangement of the cooling unit will be apparent from the showing thereof in Fig. 1. A fragmentary detail of the unit is illustrated in Fig. 16 to show an improved feature thereof. As shown in said Fig. 16, the cooling unit comprises a trough-like shell or housing 64, and a helical rotary feed screw 65 mounted therein coaxially thereof, said feed screw being adapted to propel the pellets, indicated at 66, longitudinally of the unit, which is toward the left as viewed in Fig. 16. The flight or vane of the feed screw 65 has its free margin provided with a continuous flexible rubber lip or strip 67 that engages the inner surface of the shell or housing 64. The arrangement is such that none of the pellets 66 can wedge between the margin of the screw flight and the surface of the shell, and obviates the nicety of fit that would be required to accomplish the same function were the flexible lip not employed. Another feature of the feed screw 65 is the provision of a number of metal strips 68, 68 connecting adjacent convolutions of the screw flight, near the peripheral margin of the flight. The function of the strips 68 is to agitate and tumble the pellets 66 in the cooling unit, thereby assuring that all surfaces of the pellets will be exposed to the cooling spray of water from the pipe 28, whereby cooling of the pellets is expedited. The feed screws in the drying units 30 and in the screw conveyor 38 preferably are constructed the same as screw 65, the tumbling effect produced on the pellets by the strips 68 expediting the drying of the pellets in the drying units. In the screw conveyor 38 the strips 68 assist in breaking up lumps which may result from adhesion of some of the pellets to each other.

Attention now is directed to Figs. 5 and 6 wherein the charge bin 33 is shown in greater detail. The position of the bin as shown in Fig. 5 is the reverse of the showing thereof in Fig. 1. Pellets from the last drying unit 30 are discharged into the bin 33 at the top thereof. The duct 34 through which pellets are removed from the bin extends downward into the bin almost to the bottom thereof. Extending transversely of the bin, near the top and to one side of the delivery chute 70 of the last unit 30, is a horizontal shaft 71 that is journaled in opposite walls of the bin and projects from opposite sides thereof. Carried by the shaft 71, interiorly of the bin, is a gate 72 that in the inoperative condition of the apparatus occupies the substantially horizontal position shown in full lines in Fig. 5, in which position it is located adjacent to and directly below the delivery end of the chute 70. For yieldingly holding the gate 72 substantially in horizontal position, one of the projecting end portions of shaft 71 carries a radially extending arm 73 upon which is adjustably mounted a counter-weight 74. The gate 72 is adapted to swing from the position shown in full lines in Fig. 5 to the position shown in broken lines therein, and the counter-weight 74 is so nicely adjusted on the arm 73 that the weight of a few pellets is sufficient to swing the gate downwardly. Thus the gate will remain in the broken line position until all of the pellets of a single batch of composition are received in the bin, and then swing upwardly as the flow of pellets ceases. The pellets received in the bin fall to the bottom thereof close to the open end of the duct 34, and are sucked upwardly therethrough and discharged into the pellet receiver 35 as previously has been explained, said pellets collecting in the bottom of the latter. Oscillating movement of the shaft 71, as the result of the movement of the gate 72, is utilized to effect operation of a number of instrumentalities constituting operative parts of the pellet receiver 35, said instrumentalities being electrically controlled. To this end a pair of electrical switches (not shown) such as mercury switches are enclosed in a receptacle 76 that is mounted on the wall of the bin 33. A projecting end of shaft 71 extends into the receptacle 76 and is operatively connected to the switches therein in any suitable manner so as to close one switch and open the other when the gate rises to horizontal position, and to reverse the condition of the switches when said gate is swung downwardly. The electrical circuit by means of which the various instrumentalities of the pellet receiver are operated in determinate time-relation, and are interconnected with the switches in the receptacle 76 at the bin 33, is not a part of the present invention and for that reason will not be described in detail herein, it being considered sufficient to mention only the functions of said circuit. Thus the function of one of the switches in receptacle 76 is to actuate a time relay (not shown) that delays actuation of the pellet-receiving instrumentalities until about 30 seconds after the gate 72 has risen to elevated position, thus assuring that all pellets will have been removed from the bin 33 and discharged into said pellet receiver.

The details of the pellet receiver 35 are best shown in Figs. 7 to 12. As shown therein, the receiver 35 consists of a cylindrical tank-like structure having a downwardly tapered portion 35a at the bottom thereof, which tapered portion discharges, through a gate or valve presently to be described, into the duct 37 hereinbefore mentioned. The duct 34 that conveys pellets to the pellet receiver 35 discharges them into the latter immediately above the tapered region 35a, the discharge end of said duct being provided with a hood 78, Fig. 8, that deflects the pellets downwardly into said tapered portion. Mounted upon the wall of the tapered region 35a, exteriorly thereof, and having an operating member extending through said wall is a normally open mercury switch 79, Fig. 10, said operating member being overlaid by a diaphragm 80 that is disposed interiorly of said portion 35a and subject to deflection by reason of pellets 66 piled thereagainst, thereby to operate and close switch 79. The arrangement is such that the switch 79 is closed only when a full batch of pellets is in the pellet receiver. The switch 79 is in series with other switches in the control circuit of the instrumentalities that constitute the operative elements of the pellet receiver, as presently will be explained.

The exhaust unit or suction producing device 36 is operatively connected to the pellet receiver 35 through the agency of a duct 82 that communicates with said receiver 35 at the top thereof. Mounted in said duct is a vacuum breaker 83 of any suitable construction adapted to open duct 82 to the atmosphere and thus to break the vacuum or suction in the pellet receiver. The vacuum breaker is operated by an electric solenoid (not shown) that operates in determinate time relation to other operative instrumentalities of the pellet receiver. The exhaust unit 36 comprises the usual constantly driven operating motor 84.

The pellets 66 discharged into the pellet receiver 35 are covered with dust lubricant, some of which is loose, and would be drawn into the exhaust unit 36 were not preventive means employed. Accordingly, the air withdrawn from the receiver 35 first must pass through pervious fabric sleeves 86, 86, the dust being retained on the surface of said sleeves. As shown in Fig. 7, the sleeves 86 are suspended from a vibratory frame 87 that is mounted in the top of the receiver 35, below the point where the exhaust duct 82 opens thereinto. The frame 87 is supported by a pair of parallel rock-shafts 88, 88 that are journaled in the wall of the receiver 35, both shafts having adjacent ends extended through the wall of the receiver and provided with respective parallel radial arms 89 exteriorly of the latter. The free end of one arm 89 is pivotally connected to one end of a pitman 90, the other end of the latter being connected eccentrically to a rotary element 91 having operative connection with an electric motor 92, the arrangement being such the operation of the motor oscillates the arm 89 and thereby rocks one of the rock-shafts 88. The arms 89 are pivotally connected to each other by a link 93 whereby both arms 89 and both rock-shafts 88 are operated in unison to shake the fabric sleeves 86 for the purpose of dislodging lubricating dust therefrom. The motor 92 is enclosed in a suitable housing 94 mounted upon the pellet receiver structure. Operation of motor 92 occurs in timed relation to other operative instrumentalities of the pellet receiver, as presently will be explained.

Figure 12:
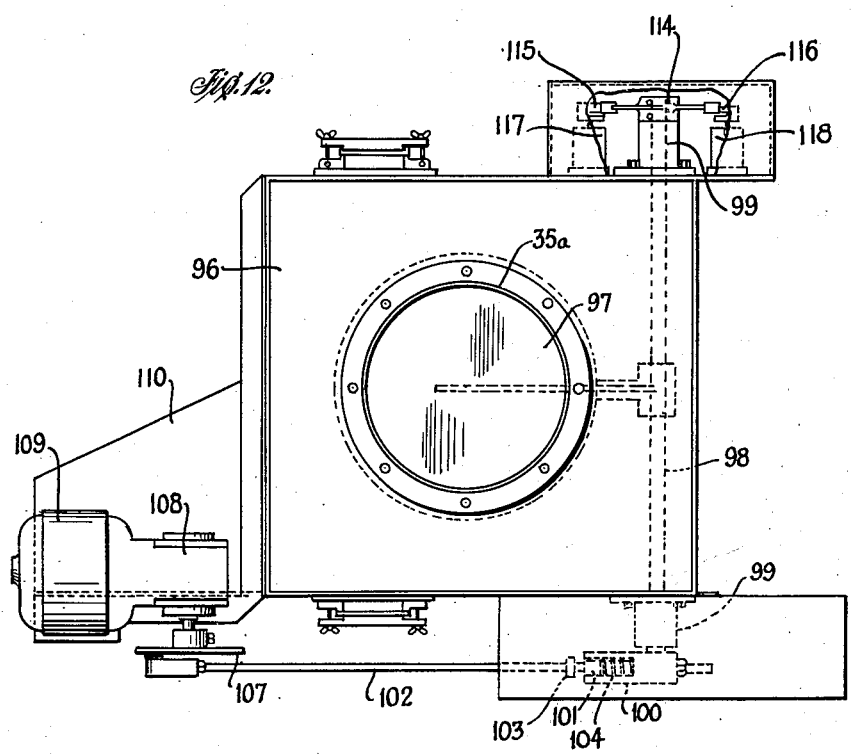
Fig. 12 is a plan view of the structure shown in Fig. 11 as viewed from the line 12—12 thereof.

Located between the tapered portion 35a of the pellet receiver 35 and the duct 37 is a gate housing 96 that encloses a gate 97. The latter is adapted normally to close the discharge opening at the bottom of said tapered portion 35a to enable pellets to collect therein, and on occasion, to open to enable a batch of the pellets 66 to pass through said discharge opening and enter the duct 37 leading to the screw conveyor 38. As is best shown in Figs. 11 and 12, the gate 97 is supported by an oscillatable shaft 98 that is journaled in suitable bearing brackets 99, 99 mounted upon opposite walls of said housing 96. Mounted upon one end portion of shaft 98 is a lever arm 100 for turning said shaft, the free end of said lever arm being pivotally connected to a collar 101 that is centrally apertured and has an operating link 102 slidably received in said aperture. A collar 103 is fixedly secured on link 102 on one side of collar 101, the other side of collar 101 being engaged by a compression spring 104 that is mounted on the link between collar 101 and a washer 105 adjustably positioned on the link near the adjacent end thereof. The other end of link 102 is pivotally and slidably engaged in an arcuate slot 106 formed in a crank arm 107 that is mounted upon a rotary shaft of a speed reduction device 108 that is operatively connected to an electric motor 109. The latter is mounted upon a bracket 110 secured to the side of the housing 96, and is adapted slowly to rotate the crank arm 107 in clockwise direction, as indicated by the arrow in Fig. 11.

The purpose of the slotted crank arm 107 is to effect rapid and full opening of the gate 97, that is, it moves it rapidly from horizontal closed position to vertical open position, both positions being shown in broken lines in Fig. 11. In the closed position of the gate, the crank arm 107 is in the position shown in Fig. 11, the slot 106 therein extending upwardly. When the motor 109 is activated, the crank arm turns in clockwise direction, but produces little angular movement of the lever arm 100 until said crank arm has made something less than a quarter of a revolution. This brings the slot 106 substantially into a horizontal position, whereupon the pivotal connection of link 102 with the crank arm slides in the slot 106 to the outer end thereof, which sliding is the result of pull on the link 102 induced by the weight of the gate 97 and the weight of the pellets 66 that rest thereon. Thus the gate 97 is enabled to move quickly to fully open position, in which position it is vertically disposed, as shown in Fig. 11, whereby the pellets are enabled to pass uninterrupted through the housing 96 and enter the duct 37 therebelow. After the gate 97 has opened, the motor 109 ceases operation and the gate remains open for a determinate interval of time sufficient for all the pellets in the pellet receiver 35 to flow therefrom, the motor subsequently resuming operation to effect closing of the gate, then again coming to rest.

Mounted upon the wall of housing 97 is a limit switch 112 that has an operating lever 113 in position to be actuated by the lever arm 100 during opening and closing of the gate 97. Mounted upon the opposite end of the gate shaft 98 from the lever arm 100 is a cam bracket 114 having cams 115 and 116 adjustably mounted thereon. Cam 115 is arranged for operative engagement with a limit switch 117 and cam 116 is arranged for operative engagement with a limit switch 118, both of said limit switches being mounted on the wall of housing 96. Cam bracket 114 turns angularly with shaft 98 to operate cams 117, 118 in determinate time relation. When the gate 97 is in horizontal or closed position, switch 112 is open, switch 117 is open, and switch 118 is opening one circuit and closing another.

Briefly, the operation of the pellet receiver is as follows: closing of one of the switches in switch box 76 on bin 33 will, except under circumstances presently explained, result in the activating of gate motor 109 to start the opening of gate 97. As said gate moves to open position, the lever arm 100 allows limit switch 112 to close, said limit switch controlling operation of the solenoid that operates the vacuum breaker 83. Opening of gate 97 also results in closing limit switch 117, which is in the control circuit of motor, and in operating limit switch 118 to break its circuit to the motor 109 but concurrently to close two other circuits in one of which is the motor 92 that vibrates the dust screens 86, and in the other of which is a time delay relay (not shown) that is in series with the other switches controlling the drive of motor 109. This operation of the time delay relay stops motor 109, but motor 92 continues to vibrate the dust screens so that lubricant falling therefrom drops onto the pellets flowing past the open gate 97 into duct 37. After the lapse of a determinate interval of time, the time delay relay closes and the motor 109 again is energized so as to close gate 97, the movement of the latter restoring limit switches 112, 117 and 118 to their original positions whereby the vibrator motor 92 ceases operating and the vacuum breaker solenoid is released to enable sub-atmospheric pressure again to be established in the pellet receiver. This completes a cycle of operation of the latter.

When the pellets pass through the duct 37 they drop into the receiving end of a screw conveyor 38, the screw of which is motor driven. The delivery end of the conveyor 38 is adjacent a monorail 40 upon which mobile storage bins 39 are carried, the arrangement being such that the bins 39 may be moved, in succession, into position to receive the pellets discharged from the screw conveyor 38. There are a pair of switches (not shown) positioned so as to be actuated by a bin 39 that is in pellet-receiving position at the delivery end of screw conveyor 38. Said switches are in series and are in the circuit of the motor of the screw conveyor 38 to effect operation of the latter automatically when a bin 39 is in proper position. Said switches also control a relay-operated switch (not shown) that is in series with other switches in the control circuit of gate-motor 109, whereby the latter cannot operate except when a bin 39 is properly positioned and the motor of pellet conveyor 38 is running. Similarly the mercury switch 79 in receiver 35 is in series with other switches controlling operation of motor 109, and serves to prevent operation of the latter unless and until a full batch of pellets is in the bottom portion 35a of the pellet receiver.

Figure 13:
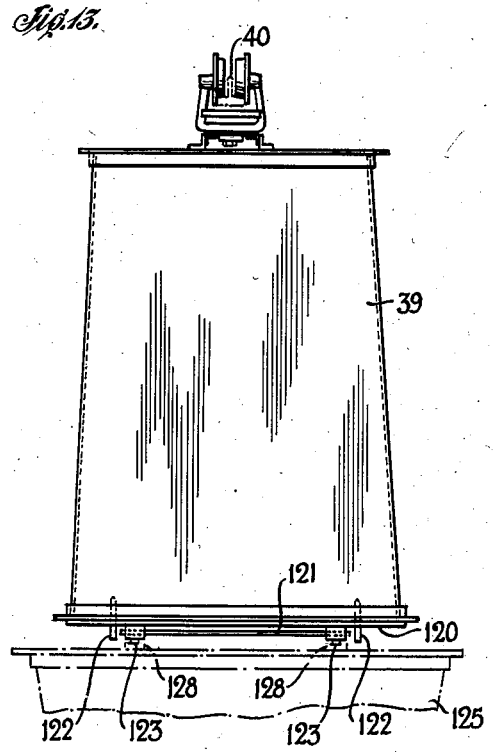
Fig. 13 is a front elevation of a mobile hopper in which pellets may be transported or stored.
Figure 14:
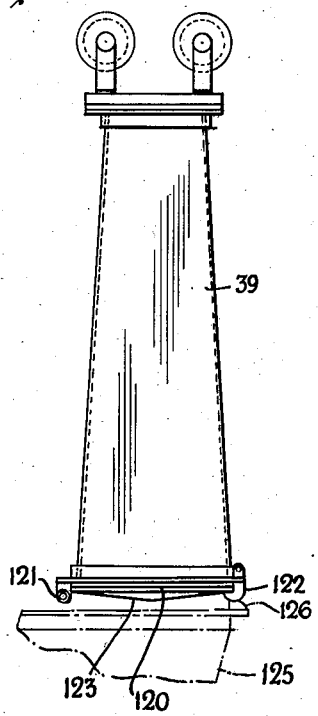
Fig. 14 is a side elevation thereof.

The storage bins 39 are shown in greater detail in Figs. 13 and 14 to which attention now is directed. The bins 39 are open at the top, and the sides of the bins diverge somewhat toward the bottom thereof to facilitate the discharge of pellets from the bins. Each of said bins has a closure 120 at the bottom thereof, which closure is hingedly attached at 121 to one side of the bin structure. Hinged to the opposite side of the bin structure are latches 122, 122 adapted automatically to engage a margin of the closure 120, when the latter is lifted to closed position, and thereby to retain the closure in closed position. On the bottom of the closure 120 of each bin 39 is a pair of parallel ribs 123, 123, the bottom margins of which each define an obtuse angle. The bins 39 are not swiveled, and always are disposed in the same relation to the monorail 40, the ribs 123 being arranged parallel to the monorail.

Figure 15:
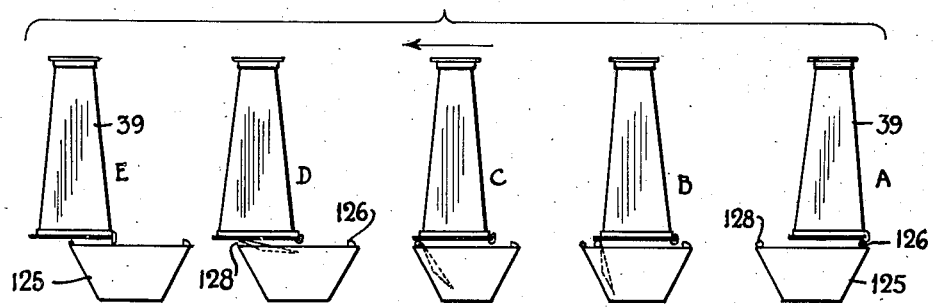
Fig. 15 is a somewhat diagrammatic view showing how a hopper automatically discharges its contents into a chute and thereafter is restored to work-receiving condition.

The latches 122 and ribs 123 are utilized to effect automatic opening of the closures 120 to dump the bins 39, and automatically to effect subsequent restoration of the closures to closed position. Dumping of the bins may discharge the contents thereof into the disintegrator 44, as shown in Fig. 1, or into any other receptacle such as the chute indicated at 125, Figs. 13 to 15. The bins 39 always move over the chute 125 in the same direction, with the hinges 121 at the leading edges of the closures 120 and the latches 122 at the trailing edges thereof. That edge of the chute 125 over which the bins 39 first pass is provided with a pair of upstanding, spaced-apart lugs 126 that are so positioned as to intercept the latches 122 of the bins, thereby to effect such tilting of said latches as to release the closures 120 of the bins, said closures then opening by gravity and discharging the contents of the bins into the chute. Fig. 14 and detail A of Fig. 15 show the position of the parts at the moment the latches 122 engage the lugs 126. Detail B of Fig. 15 shows the closure 120 in open position whereby the pellets are enabled to drop into chute 125.

After a bin-closure 120 has been opened, it is automatically closed as the bin continues to move along its course on the monorail 40. To this end a pair of rollers 128, 128 are mounted upon the edge of the chute 125 that is opposite the edge that mounts the lugs 126. The rollers 128 are spaced apart, and are positioned to intercept and engage the respective ribs 123 of a bin-closure 120 as a bin moves over the chute. The arrangement is such that the rollers 128 effect the closing of the closure, as is shown in details C, D, and E of Fig. 15, the latches 122 then automatically engaging the closure to hold it in closed position.

Figure 17:
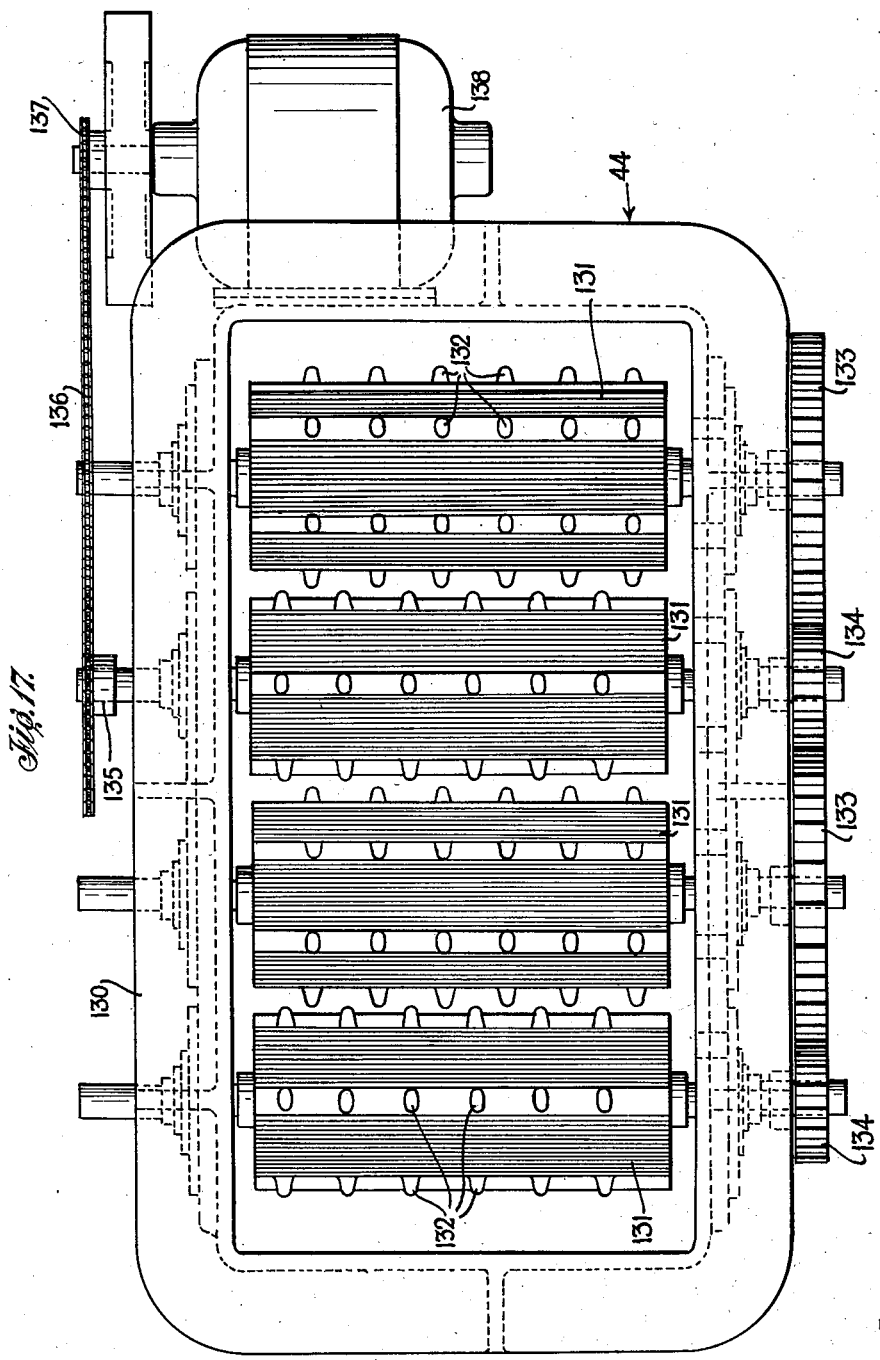
Fig. 17 is a plan view of disintegrating apparatus for separating pellets that may be packed together or lumped.

The disintegrator 44 that receives pellets discharged from the storage bins 39 is shown in greater detail in Fig. 17. It comprises a housing 130 that is open at top and bottom, and a plurality of generally cylindrical rotary members 131, 131 journaled in opposite sides of the housing and extending transversely thereof. The rollers 131 are of the same size and length, and are positioned parallel to each other, but in somewhat spaced relation to enable pellets to pass therebetween. Each rotary member 131 is formed with several circumferential series of radially projecting lugs or studs 132, 132, the studs on each member being offset or staggered with relation to the studs of an adjacent member or members, said studs projecting part way across the space between adjacent members 131. The rotary members are driven in unison, adjacent members being driven in opposite directions at differential speeds. Thus alternate members are driven at relatively fast speed whereas intermediate members are driven at relatively slow speed. To this end the shafts of the members 131 extend beyond one side of the housing 130 and are provided with intermeshed gears of which gears 133, 133 are of large pitch diameter and are mounted on the shafts of the first and third rotary members, counting from the right thereof as viewed in Fig. 17, end gears 134, 134 are of relatively small pitch diameter and are mounted upon the shafts of the second and fourth rotary members. For driving the rotary members 131, the shaft of one of them has a projecting end portion upon which is mounted a sprocket 135 that is connected by a sprocket chain 136 to a sprocket 137 that is mounted upon the shaft of a motor 138 that is positioned beside the disintegrator. The arrangement is such that lumps of pellets too large to pass between the rotary members 131 will be rolled and tumbled thereby and kneaded by the lugs 132 so that the adhesion between pellets will be destroyed and pellets that drop through the spaces between the rotary members will be substantially in discrete form.

The hopper 45 that receives the pellets from the disintegrator 44 is known as a "Syntron" vibrator. Its function is to feed the pellets evenly and substantially at a uniform rate onto the endless belt conveyor 46, until a determinate quantity of the pellets have been deposited thereon. To this end the operation of the motor that operates the vibrator is controlled by the weighing scale 47 that is operatively associated with the endless conveyor 46, the arrangement being such that the said motor ceases operation as soon as the desired quantity of the pellets have been deposited upon the conveyor 46.

The remainder of the apparatus of the system, namely, the "Banbury" mixer 49 in which the final compounding operation is effected and the sheeting mill 51, is of standard or conventional design so that no detailed description thereof is believed to be required.

From the foregoing it will be apparent that the apparatus is largely automatic in operation, thus effecting a saving of labor. The invention also effects substantial saving of time, results in improved working conditions, and achieves the other advantages set out in the foregoing statement of objects.

Figure 18:
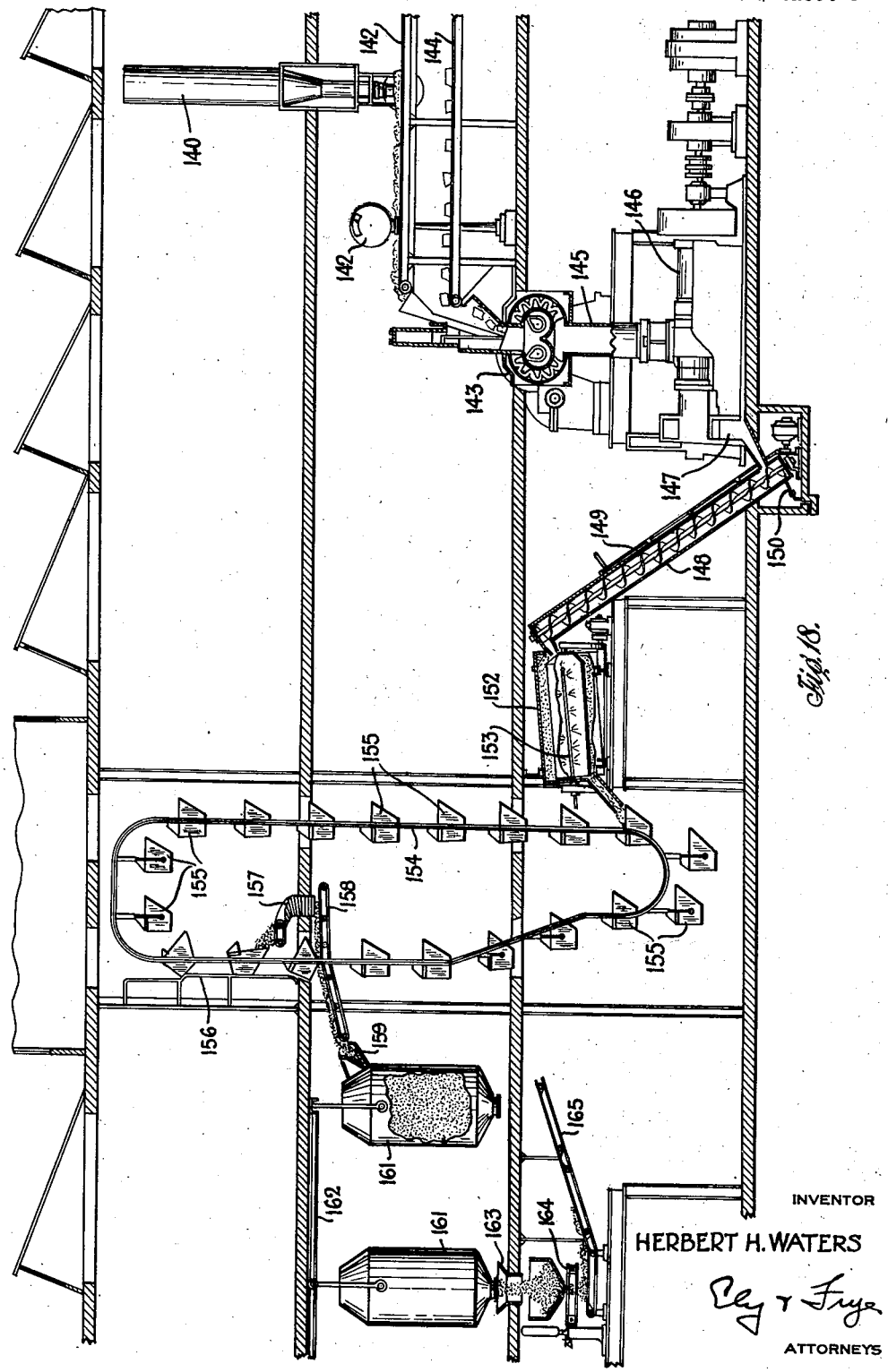
Fig. 18 is a somewhat diagrammatic view of a modified embodiment of the invention.

The embodiment of the invention shown in Fig. 18 of the drawings differs somewhat from that previously described in the apparatus employed, the method, however, being essentially similar. As shown in Fig. 18, pigment or other initial compounding ingredients are withdrawn by gravity from supply bins, such as the supply bin 140, and deposited upon an endless conveyor 141 where it is weighed by a weighing scales 142, said conveyor discharging into the hopper of a conventional "Banbury" mixer 143. A second endless conveyor 144, also discharging into the hopper of Banbury 143, is provided for bringing unvulcanized rubber thereto. After the rubber and pigments have been intimately mixed and plasticized in the Banbury, the entire batch is discharged into a chute 145 that conveys the batch, by gravity, to a pelletizer 146. The latter is identical with the pelletizer 25 previously described, and has a dusting apparatus 147 operatively associated therewith for applying dust lubricant to the pellets produced thereby. Pellets discharged from the dusting apparatus enter the lower end of an upwardly inclined screw conveyor 148, to be conveyed upwardly thereby and discharged at the upper end thereof. The pellets are cooled while in the conveyor 148, and to this end a spray pipe 149 is arranged along the top of the conveyor and equipped to spray cold water onto the pellets therein. A drain pipe 150 removes excess water from the bottom of the conveyor.

The wet pellets discharged from the screw conveyor 148 are received in a rotary drum 152 at one end thereof, and discharged from the opposite end, said drum being downwardly inclined toward its delivery end so that the pellets move therethrough by gravity. Within the drum 152 is a pipe 153 that discharges cold air onto the pellets as they are agitated and tumbled by the drum, which air assists in drying moisture that is on the pellets, and also exerts additional cooling effect thereon. The discharge end of the drum 152 is located adjacent the upwardly-moving reach of a vertically arranged constantly driven endless conveyor chain 154, which conveyor chain carries a plurality of tiltable buckets 155. Said buckets are so constructed and arranged that their open sides normally are upwardly presented as they pass the discharge end of the drum 152, and thus they receive, in succession, the pellets issuing from said drum. The filled buckets 155 are carried by the conveyor chain 154 to the downwardly moving reach thereof, where they encounter a tilting device 156 that extends into the orbit of the buckets and tilts them to the extent that they discharge their cargo of pellets. The latter, falling from the buckets 155, are received in a chute 157 down which they flow by gravity and are discharged from the lower end thereof onto the receiving end of an endless conveyor 158. At the delivery end of the conveyor 158 is a short chute 159 into which the pellets on the conveyor are dumped.

For storing the pellets, a plurality of hoppers 161 are provided, said hoppers being suspended from a monorail 162. The latter is so arranged that hoppers may be moved under the chute 159 and filled with the pellets discharged therefrom. The hoppers 161 are provided with discharge openings at the bottom thereof. When it is desired to remove and utilize the pellets in a hopper 161, the latter is moved to a position over a chute 163, and the pellets discharged into the latter, said pellets passing therethrough and being received upon a weighing scale 164. The latter weighs the pellets that are received thereon, so that determinate quantities of the pellets may pass from the weighing scale onto an endless conveyor 165 positioned therebelow. The conveyor 165 discharges the pellets into a Banbury mixer (not shown) which may be identical with the mixer 49 shown in Fig. 1, and perform the same function as the latter, namely, the final compounding of the rubber batch. A warming and sheeting mill (not shown) similar to mill 51 of Fig. 1 may be provided if desired.

The method of the invention is the same in both embodiments described, but the apparatus shown in Fig. 18 is somewhat simpler and does not employ all of the automatic features present in the embodiment shown in Fig. 1.

Other modification may be resorted to without departing from the spirit of the invention or the scope of the appended claims, which are not limited wholly to the exact procedure described or the specific construction shown.

What is claimed is:

1. The method of processing rubber compound which comprises mixing a batch of rubber with primary compounding ingredients in the presence of heat, dividing the batch into discrete free-flowing pellets, applying dust lubricant to the pellets, spraying the pellets with water to cool the pellets, passing a current of air over and about the pellets to dry the same and effecting further cooling thereof, further drying, cooling and transferring the pellets into a storage zone by an air stream, subjecting the pellets to a disintegration operation to break up lumps of mutually adhering pellets which may have formed and subsequently milling the pellets into a single mass and concurrently introducing secondary compounding ingredients thereunto, and then employing the fully compounded material in the manufacture of commodities.

2. The method of processing rubber compound which comprises mixing a batch of crude rubber with primary compounding ingredients in the presence of heat, dividing the batch into discrete free-flowing pellets, applying dust lubricant to the pellets, spraying the pellets with water to cool them, passing a current of air over and about the pellets to dry them and to effect further cooling thereof, accumulating the pellets from said batch into a single charge, drawing by an air stream said charge of pellets into an elevated location and storing them, separating the stored pellets into separate predetermined quantities, separating the pellets which have become mutually adhering, automatically weighing and delivering the separated pellets and subsequently milling the pellets into a single mass and concurrently introducing secondary compounding ingredients therewith.

HERBERT H. WATERS.

REFERENCES CITED

The following references are of record in the file of this patent:

UNITED STATES PATENTS

| Number | Name | Date |
| --- | --- | --- |
| 87,613 | Abbott | Mar. 9, 1869 |
| 955,606 | Moreau | Apr. 19, 1910 |
| 1,165,499 | Gebhardt | Dec. 28, 1915 |
| 1,304,553 | Gadd | May 27, 1919 |
| 1,816,822 | Bell | Aug. 4, 1931 |
| 2,021,961 | MacFarlane | Nov. 26, 1935 |
| 2,319,859 | Hale | May 25, 1943 |

OTHER REFERENCES

"India Rubber World," vol. 104 of 1941, numbers of June (pages 35–38), July (pages 29–33) and Aug. (pages 33–38).